(12) United States Patent
Cobb et al.

(10) Patent No.: US 7,313,562 B2
(45) Date of Patent: Dec. 25, 2007

(54) RHETORICAL CONTENT MANAGEMENT SYSTEM AND METHODS

(75) Inventors: John Neil Cobb, Plano, TX (US); Yeow Loong Lee, St. Louis, MO (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/595,099

(22) Filed: Nov. 9, 2006

(65) Prior Publication Data

US 2007/0055682 A1    Mar. 8, 2007

Related U.S. Application Data

(60) Continuation of application No. 11/498,219, filed on Aug. 2, 2006, which is a division of application No. 10/635,419, filed on Aug. 6, 2003, now abandoned.

(51) Int. Cl.
*G06F 17/00* (2006.01)

(52) U.S. Cl. ............................. 707/100; 707/102; 704/9

(58) Field of Classification Search ................ 707/3–6, 707/10, 100–102, 104.1; 704/1, 2, 4, 8–10; 709/217, 218, 219; 715/500, 515, 531
See application file for complete search history.

(56) References Cited

U.S. PATENT DOCUMENTS

| | | | | |
|---|---|---|---|---|
| 5,819,260 | A * | 10/1998 | Lu et al. ........................ | 707/3 |
| 6,026,388 | A * | 2/2000 | Liddy et al. .................... | 707/1 |
| 6,112,168 | A * | 8/2000 | Corston et al. ................. | 704/9 |
| 6,185,587 | B1 * | 2/2001 | Bernardo et al. ............ | 715/513 |
| 6,263,336 | B1 * | 7/2001 | Tanaka ........................... | 707/6 |
| 6,349,316 | B2 * | 2/2002 | Fein et al. .................... | 715/531 |
| 6,675,159 | B1 * | 1/2004 | Lin et al. ........................ | 707/3 |
| 6,901,402 | B1 * | 5/2005 | Corston-Oliver et al. ... | 707/101 |
| 7,013,259 | B1 * | 3/2006 | Polanyi et al. ................. | 704/7 |
| 7,092,974 | B2 | 8/2006 | Thomas et al. | |
| 2005/0033750 | A1 * | 2/2005 | Cobb et al. ................. | 707/100 |
| 2006/0271578 | A1 * | 11/2006 | Cobb et al. ................. | 707/100 |
| 2007/0033207 | A1 * | 2/2007 | Cobb et al. ................. | 707/100 |
| 2007/0067371 | A1 * | 3/2007 | Allan et al. ................. | 707/206 |

* cited by examiner

*Primary Examiner*—Jeffrey Gaffin
*Assistant Examiner*—Jacques Veillard
(74) *Attorney, Agent, or Firm*—Toler Schaffer, LLP

(57) ABSTRACT

The present disclosure is directed generally to a method of content management. The method includes receiving a user input entered in a plurality of grammatical structured text entry elements associated with a content subject, each of the plurality of grammatical structured text entry elements having a rhetorical structure to facilitate selective assembly into at least one sentence, storing the plurality of grammatical structured text entry elements in a data record associated with the content subject, converting at least a portion of the data record into a structured format file supporting rhetorical elements, and rendering an electronically displayable document using the structured format file. The electronically displayable document includes the at least one grammatical structured text entry element integrated into at least one sentence. The structured format file includes at least one grammatical structured text entry element of the plurality of grammatical structured text entry elements.

27 Claims, 5 Drawing Sheets

Technical XML Structure (Code)
```
<?xml version="1.0" encoding="iso-8859-1" ?>
<Product_Profile>
  <Product id="1">
    <Region>
      <PAC>
        <Product_Name>DSL Internet</Product_Name>
        <Expanded_Product_Name>Digital Subscriber Line (DSL)
            Internet</Expanded_Product_Name>
        <Updated_Date>2002-01-24</Updated_Date>
        <Updated_Time>13:54:00</Updated_Time>
        <Description>
          <Classical_Def>
602 ─── <Class_Description>high speed, point-to-point digital
            connection </Class_Description>
604 ─── <Product_Description>uses regular telephone lines to
            simultaneously transmit voice and
            data.</Product_Description>
606 ─── <Comp_Old_New>DSL Internet allows you to connect to the
            Internet at speeds 50 to 200 times faster than a 28.8
            kbps modem.</Comp_Old_New>
          </Classical_Def>
```

Layout in XSLT
SBC Pacific Bell <Expanded Product Name> is a <Class Description> that <Product Description>. <Comp Old New>

Actual Output
SBC Pacific Bell Digital Subscriber Line (DSL) Internet is a high speed, point-to-point digital connection that uses regular telephone lines to simultaneously transmit voice and data. DSL Internet allows you to connect to the Internet at speeds 50 to 200 times faster than a 28.8 kbps modem.

*FIG. 6*

RHETORICAL CONTENT MANAGEMENT SYSTEM AND METHODS

CLAIM OF PRIORITY

The present application claims priority from and is a continuation of U.S. patent application Ser. No. 11/498,219 filed on Aug. 2, 2006 and entitled "Rhetorical Content Management System and Methods," which is a divisional application of U.S. patent application Ser. No. 10/635,419 filed Aug. 6, 2003, now abandoned, the contents of which are expressly incorporated herein by reference in their entirety.

FIELD OF THE DISCLOSURE

The present disclosure relates generally to rhetorical content management systems and methods for their use.

BACKGROUND

Content management is useful for providing a consistent image through various content delivery methods. For example, content management may be useful in providing a consistent product description across multiple sales and marketing mediums such as websites, proposals, brochures, and other documents.

However, content management becomes a significant problem for large organizations having multiple products or product lines. A large amount of content is provided to a large number of users. These problems may be further exacerbated by variances in regional availability, market targeting, and the greater demand for content through large sales channels. Delivery of suitable content is often slow.

In addition, content creation is a significantly expensive process. Initial creation is expensive. After initial content creation, the content may not be suitable for various purposes. As such, expenses increase as content is manually adapted for various uses.

Some organizations rely on multiple content management systems. Each system is managed by a different section. As such, content is created more than once and varies between sections. Therefore, it is difficult to create content that is consistent and accurate.

For large entities with extensive product lines, content management becomes a large and expensive process. As such, an improved content management system would be desirable.

SUMMARY

The present disclosure is directed generally to a content management system, a method of content management, a rhetorical content model, and automated methods of generating proposals and other documents based thereon.

In a particular illustrative embodiment, the content management system includes a database including a plurality of records and a server responsive to the database. At least one of the plurality of records includes a plurality of fields storing grammatical syntax elements associated with a content subject. Each of the grammatical syntax elements is associated with a rhetorical rule and structure to facilitate selective assembly into at least one sentence or paragraph. The server is configured to selectively retrieve at least one of the grammatical syntax elements and to provide a data file including the selectively retrieved grammatical syntax element.

In accordance with another embodiment, the method of content management includes receiving a user input entered in a plurality of grammatical structured text entry elements associated with a content subject; storing the plurality of grammatical structured text entry elements in a data record associated with the content subject; converting at least a portion of the data record into a structured format file supporting rhetorical elements; and rendering an electronically displayable document using the structured format file. Each of the plurality of grammatical structured text entry elements has a rhetorical structure to facilitate selective assembly into at least one sentence. The structured format file includes at least one grammatical structured text entry element of the plurality of grammatical structured text entry elements. The electronically displayable document includes the at least one grammatical structured text entry element integrated into at least one sentence.

In accordance with another particular embodiment, a content management input tool is disclosed. The content management input tool includes an entry page associated with a content subject, the entry page including a text entry form element for receiving input text having a specified length, the input text constrained in accordance with a grammatical syntax format associated with a rhetorical rule and structure, and a selection element configured to initiate manipulation of a data record associated with the content subject upon activation of the selection element. The data record is stored in a database In accordance with another particular embodiment, a content delivery application is disclosed. The content delivery application includes a gateway program configured to receive requests associated with a content subject, the requests being received via a distributed network; a rhetorical data file including a tag-separated data structure, the tag-separated data structure identifying a set of grammatical phrase structures; and a parser responsive to the rhetorical data file. The parser is configured to selectively construct content relating to the content subject using at least one grammatical phrase structure of the set of grammatical phrase structures. The parser is configured to provide the content to the gateway program.

In a further embodiment, an automated method of generating a proposal or other document is disclosed. The method includes retrieving a first rhetorical element of a plurality of rhetorical elements available for retrieval from computer; retrieving a second rhetorical element from the plurality of rhetorical elements; constructing a sentence by combining the first rhetorical element and the second rhetorical element; and automatically generating the proposal including the sentence.

In accordance with another particular embodiment, a method of generating an electronically distributable document is disclosed. The method includes retrieving a first rhetorical element of a plurality of rhetorical elements available for retrieval from computer storage; retrieving a second rhetorical element from the plurality of rhetorical elements; constructing a sentence by combining the first rhetorical element and the second rhetorical element; and generating the electronically distributable document including the sentence.

In yet a further embodiment, a rhetorical content model is disclosed. The rhetorical content model includes a first computer retrievable grammatical syntax element associated with a rhetorical structure and a second computer retrievable grammatical syntax element associated with the rhetorical structure. The rhetorical structure is to facilitate selective assembly of the first computer retrievable grammatical syntax element and the second computer retrievable grammatical syntax element into a sentence.

BRIEF DESCRIPTION OF THE DRAWINGS

FIG. 6 depicts an exemplary rhetorical data structure.

DETAILED DESCRIPTION OF THE DRAWINGS

Figure 1:
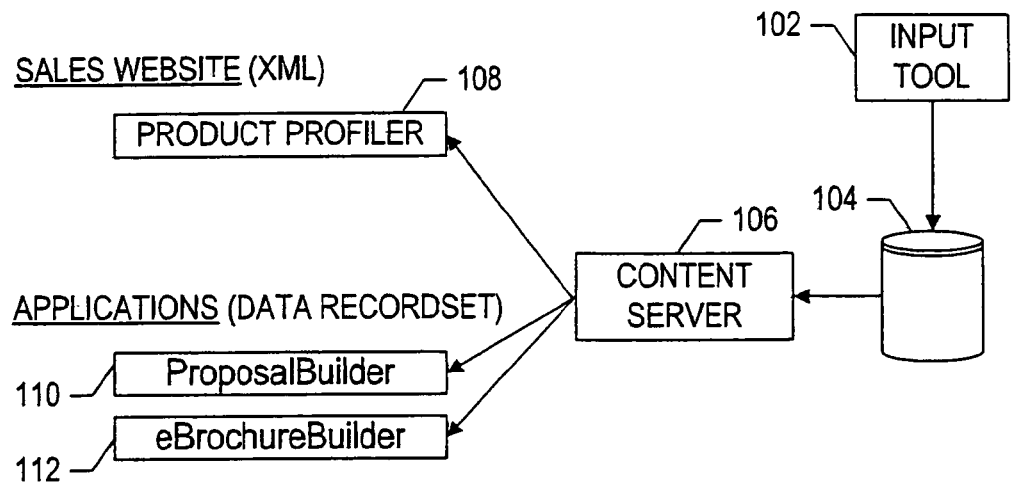
FIG. 1 depicts an exemplary embodiment of a content management system.

FIG. 1 depicts an exemplary embodiment of a content management system. The content management system includes a content database 104 and a content server 106. In addition, the content management system includes an input tool 102 and various applications 108, 110 and 112.

The input tool 102 is used to gather content segments and store those segments in a database 104. The content segments may, for example, be sentence fragments, phrases, nouns, sentences, and paragraphs. In one exemplary embodiment, sentence fragments are entered, following a specific grammatical format that fulfills a specified rhetorical purpose. Using the rhetorical format, parts of a sentence may be gathered, stored and associated as fields in the content database 104. Rhetorical principles control the development of the syntax from the grammatical elements and drive the deployment of the content to the application based on the communication function that the write wants to achieve.

The database 104 may be a database such as an Oracle® or SQL database. The database 104 stores records or file references. Each record is associated with a content subject and may have multiple fields. The fields may contain sentence fragments, phrases, sentences, nouns, and paragraphs. This content data may be selectively used to construct content associated with the content subject.

The content server 106 is coupled to the database 104 and accesses the records associated with the content subjects. Applications such as product profiler 108, proposal builder 110, and e-brochure builder 112 access the content server 106, requesting content associated with a content subject. The content server 106 accesses the database 104 to selectively retrieve requested fields of the record associated with the requested content subject. The content server 106 may provide the content elements in various formats, including a data record set and an XML document.

The applications may construct content using the various formats or models. Some of the fields in the record may, for example, follow a rhetorical model. In this example, the model utilizes sentence elements having a specific grammatical form designed to meet a particular rhetorical or communication function. The sentence elements or grammatical syntax rules may be used to construct a sentence. In one exemplary embodiment, the rhetorical model may be used to form a sentence having three elements, a product name, product class, and product description as shown below.

<<Product name>> is a <<Product class>> that <<Product description>>.

To produce a grammatically correct sentence, the elements follow specific grammatical forms. For example, the product name is a noun, the product class may be a noun that agrees with the singular verb "is" and singular article "a", and the product description may be a phrase beginning with a third-person singular active verb. An example is <<A chair>> is a <<piece of furniture>> that <<has four legs, a platform for sitting, and a back to lean against>>.

Sentence elements may be stored in the database 104. Fields within records associated with content subjects may store grammatical syntax elements that may be used to create sentences based on one or more rhetorical formats. For example, the product name and product class may be used to make a sentence. In another example, the product name field and product description may be used to build another sentence. Alternately, the product name may be used with another element to build a third sentence.

In addition, fields within the record may be used to store phrases, sentences, or paragraphs that fulfill a specified rhetorical/communication function. For example, fields may store teaser sentences, point statements, illustrative descriptions, analogy statements, and feature statements. For example, sentences or phrases may relate to additional differentiators such as differentiating details such as physical or conceptual differences to other products in a class, comparisons with older technologies, examples, inventories, and analogies. In another example, a point statement may be included that further describes the product such as an advantage or usage from the target audience's point of view.

The database may further store contexts in which a content or content element is applicable. For example, content elements relating to the same content subject may be provided for different markets, regions, and branding efforts. In one exemplary embodiment, different legal statements may be provided for use with content based on the region. In another example, different content elements may be provided for marketing to different target markets. In a further example, different content elements such as product names may be associated with a content subject for different branding efforts. Different content elements may be provided for various technical levels as well.

The fields stored within the records may then be queried to selectively retrieve elements that may be utilized to create content. One exemplary application is the product profiler system 108. The content server 106 provides a tagged-segmented data file, such as an extensible markup language (XML) file, including the requested data elements to the product profiler system 108. The product profiler system 108 interprets the tagged-segmented data file to produce content for delivery through a network such as via a web page.

In other exemplary embodiments such as proposal builder 110 or e-brochure builder 112, the content server 106 may provide the content elements as a data record set. The applications 110 and 112 interpret the data record set, selectively utilizing the content elements to develop context-specific content. The content may then be provided in a document, flash file, PDF, or other electronic format.

In one exemplary embodiment, the content management system may be integrated with enterprise architecture. Applications may reside on a user end of the architecture while the content server and database reside in a business services section. In other embodiments, the system may be implemented on an intranet and use browser technology.

In this manner, content elements associated with a content subject may be reused in various contexts or for various purposes. As such, the content elements may be re-purposed and utilized automatically.

Figure 2:
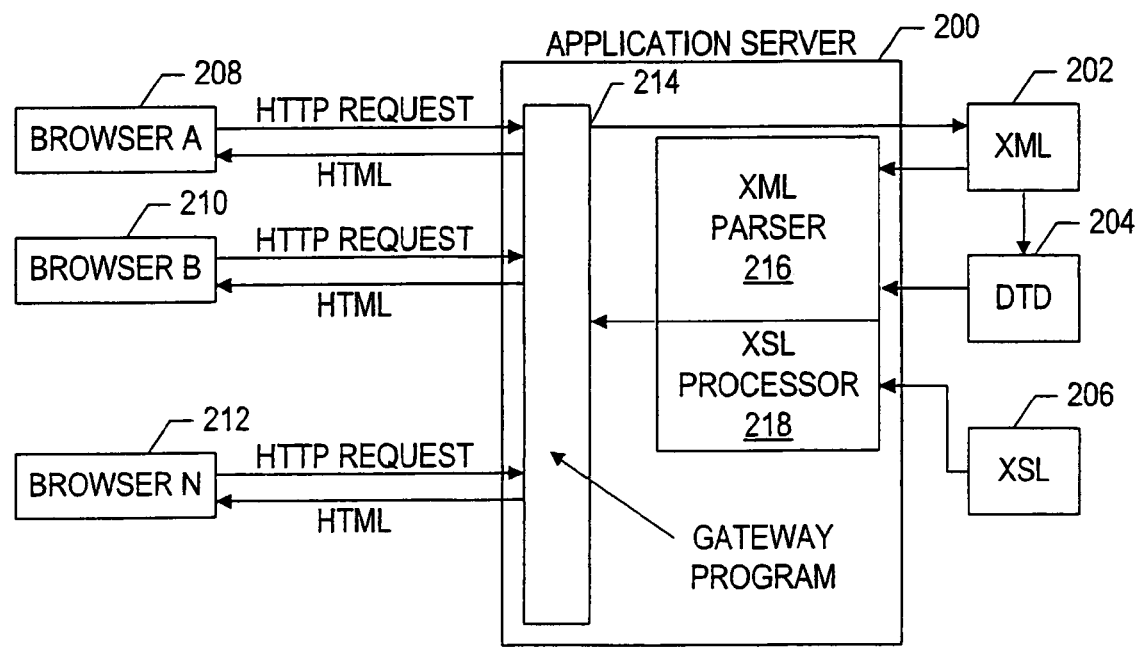
FIG. 2 depicts an exemplary embodiment of a rhetorical content delivery system.

FIG. 2 depicts an exemplary application for creating content. In this exemplary embodiment, a website may be delivered to users. The pages may include content automatically created using the content elements stored in the database. An application server 200 receives requests associated with a content subject from browsers 208, 210 and 212. The application server may have a gateway program 214 that acts to receive the requests and provide the output. In exemplary embodiment, the gateway server 214 receives HTTP requests and provides each HTML web page content.

Upon receiving a request from the gateway program 214, the application server 200 may acquire an extensible markup language (XML) file 202 associated with the requested content subject. The XML may have tags that identify the elements. The XML file 202 may be interpreted by an XML parser 216. The XML file 202 may be associated with a document type definition (DTD) file 204 and further interpreted in accordance with the document type definition (DTD) file 204. The application server 200 may also include an XSL file 206 as interpreted by an XSL processor 218. Together, the XML parser 216 and the XSL processor 218 provide content elements to the gateway program 214. The gateway program 214 assembles the content elements into content included in the web pages.

Each web page may utilize different elements derived from the grammatical syntax fields stored in the database and transferred utilizing the XML file 202. In this manner, the content elements may be utilized in accordance with the intended purpose of the content.

Figure 3:
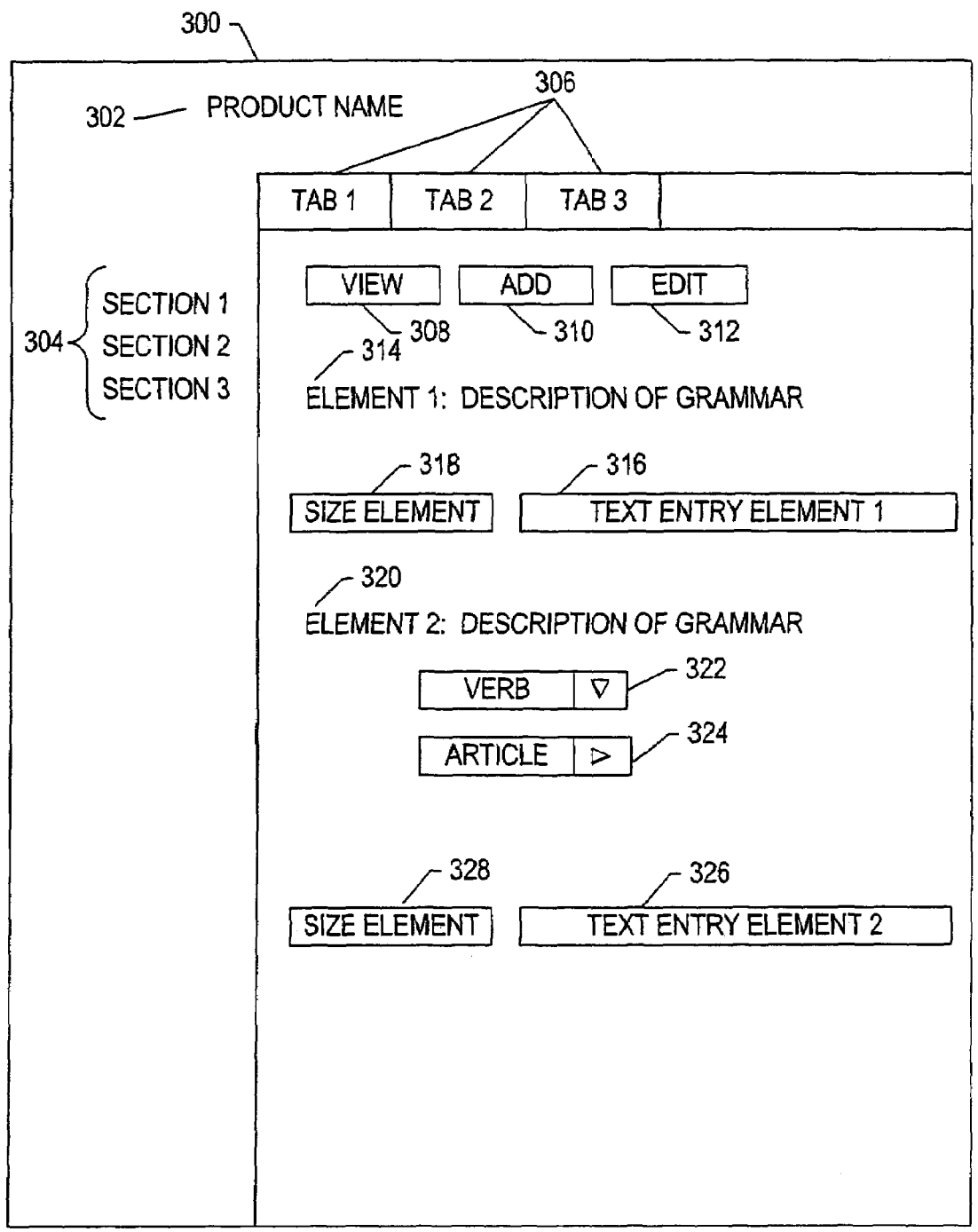
FIG. 3 illustrates an exemplary embodiment of an input tool.

FIG. 3 depicts an exemplary user interface or input tool for entering data into a rhetorical content management database. In this exemplary embodiment, the content subject is a product. The user interface takes the form of a page 300 that includes a product name 302. The page may, for example, be a web page.

Data associated with the product may be subdivided into sections 304, each section having an associated entry page or anchor within the displayed page. The sections may, for example, be subdivisions associated with what a product does, how it works, what it is, general information, branding information, frequently asked questions associated with the product, teasers, product features, advantages, applications, implementation, success stories, components, diagrams, options, availability, legal notices, white papers, and other information.

The interface may be further subdivided into tabbed sections that define certain grammatical structures for a particular content subject, using tabs 306. These tabbed sections may be displayed as individual web pages and each section may have multiple tab pages associated with it. In addition, each page may include an element such as a button. The pages may include buttons such as a view button 308, and add button 310, and an edit button 312. The view button 308 may facilitate a display of content elements associated with the product name 302. The add button 310 may add content entered into the page to the record in the database. The edit button 312 may, for example, unlock text entry fields, permitting editing of text associated with the content elements. Alternately, other buttons may be used to manipulate records within the database.

In this exemplary embodiment, two content elements are shown. Element 314 includes a description of the grammar rules to be applied when entering text. The element 314 may additionally include a text entry form element 316 and a size element 318 that indicates either total size permitted in the text entry element 316, the number of characters remaining for use in the text entry element 316, or the number of characters used in the text entry element 316. For example, element 314 may be a sentence or product tease designed to grab the attention of a potential purchaser. The grammatical and content-guidance rules associated with element 314 may require or suggest that the element be entered as a sentence or a question. The text entry element 316 may, for example, be limited to a size of 250 characters. As the text entry element 316 is used, the number of characters remaining may be displayed in the size element 318.

Element 320 may, for example, be a product classification. The product classification may be used in a rhetorical or classical rhetorical format and require an associated verb, article, and structured phrase or noun. In the exemplary embodiment, a drop-down menu is provided for selecting a verb form that agrees with a controlling grammatical element 322 such as "is" or "are". Another drop-down menu 324 is provided for selecting an article such as "a" or "an". A text entry form element 326 is provided for entering the product class syntax. In addition, a size element box 328 may be provided. For example, in a classic rhetorical format, a sentence may be constructed using the product name 302, the verb selected in menu 322, the article selected in menu 324, and the text in the text entry form element 326. The sentence would read: <<Product name>> is/are a/an <<text entry>>. The verb selected in menu 322, the article selected in menu 324, and the text of text entry element 326 may be stored in a database and reapplied as needed for specific purposes.

Other elements may be entered such as product descriptions, teasers, descriptions of how a system works, success stories, feature names, and point statement sentences. These elements may also have an associated field in the records of the database.

Figure 4:
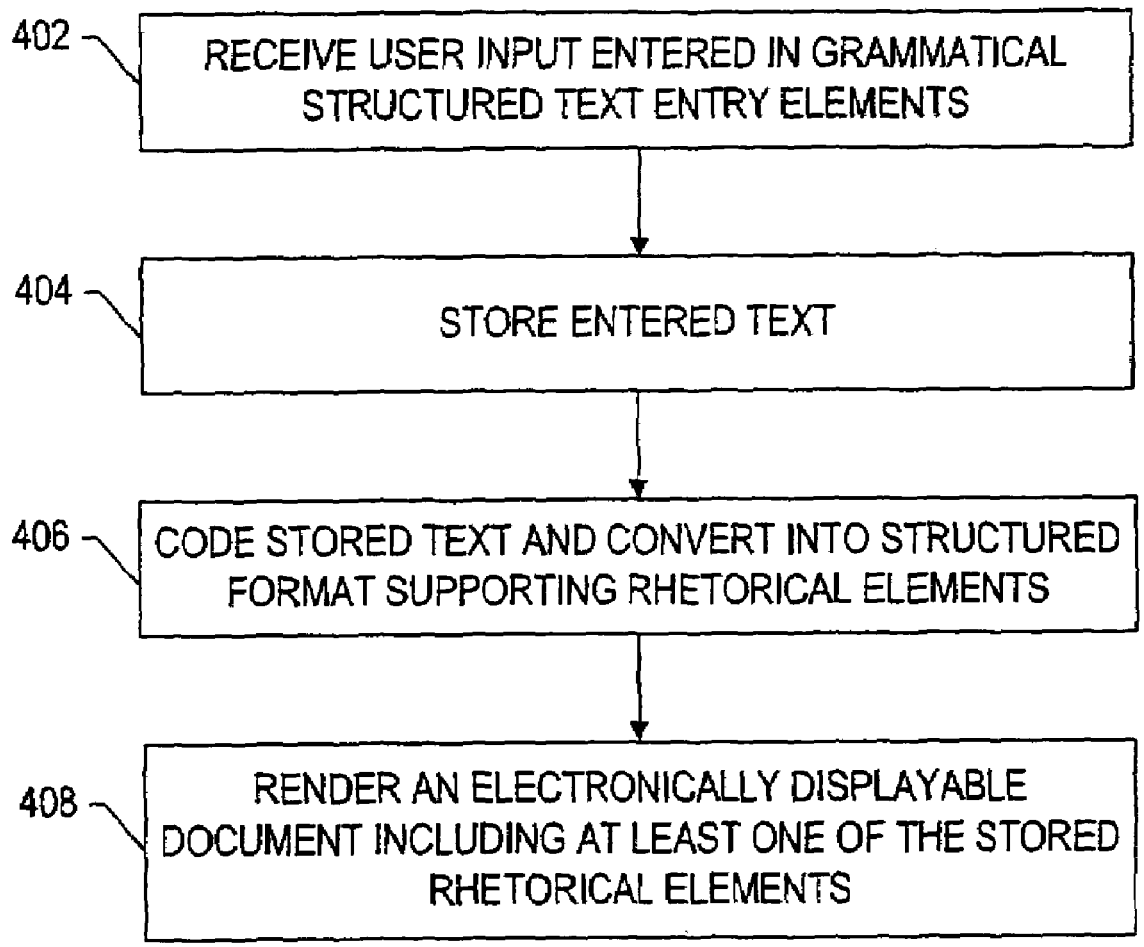
FIG. 4 depicts an exemplary method of content management.

FIG. 4 depicts an exemplary method of content management. The content management system may receive a user input entered in the grammatically structured text entry elements as shown at step 402. The text entered in its grammatically structured format may be stored in the database records as shown at step 404. Some fields may store nouns. Other fields may store phrases starting with a specific verb having a specific tense and number. These fields may be combined according to their associated rhetorical structure to form sentences. Additional fields may store sentences and paragraphs having an associated purpose. The database stores these elements to fulfill rhetorical/communication purposes.

The content management system may then code the stored text and convert it into structured format-supporting rhetorical elements as shown at step 406. For example, the content management system may query the records and create data record sets. In another embodiment, the content management system may query the stored records and formulate tag-structured data files such as XML files for use by other applications. The content management system may then render an electronically displayable document including at least one of the stored rhetorical elements as shown at step 408. For example, the content management system may display a web page utilizing some of the rhetorical data elements. Alternately, the content may be re-purposed and utilized for brochures, proposals, or other documents needing to fulfill a similar rhetorical/communication purpose. The content used in the brochures or proposals may utilize different rhetorical elements from those utilized in providing content for web pages, or in some cases, use the same elements or subsets, depending on the space available and the degree on content needed.

Figure 5:
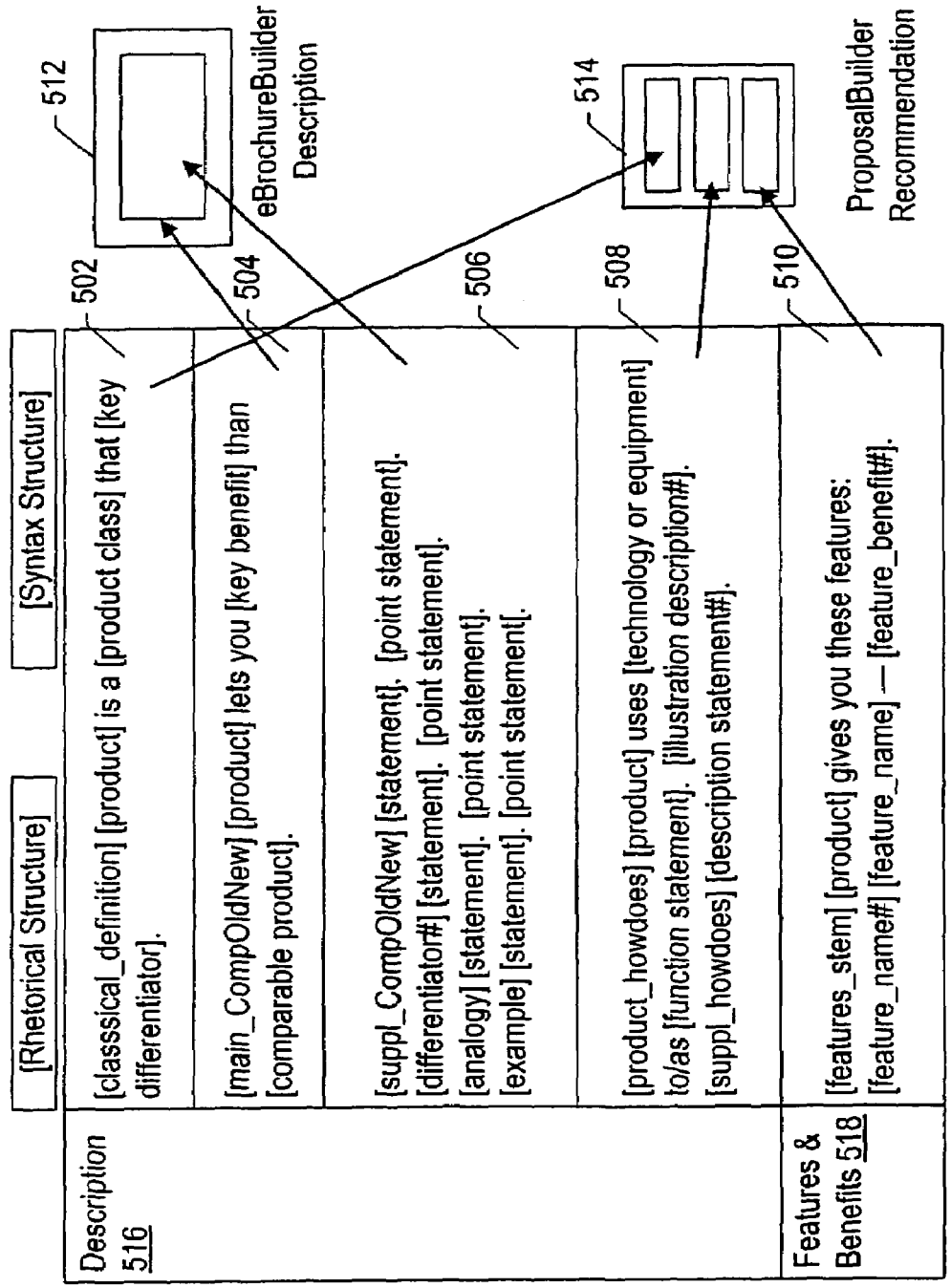
FIG. 5 illustrates an exemplary distribution/repurposing of rhetorically structured content.

FIG. 5 depicts the exemplary use of content data associated with a content subject and its selective use in various applications. The data may be organized into a description 516, features and benefits 518, and other categories. Elements may be stored that can be used in a rhetorical structure to produce content. Each of the elements for use in a rhetorical structure may have a syntax that has the appropriate grammatical format for use in the rhetorical structure. In one exemplary embodiment, a classical rhetorical definition 502 may be used. A sentence structure may be provided such as <<Product name>> is a <<product class>> that has <<a key differentiator>>. A data structure may be provided that stores the product name, the product class, and the key differentiator. The product name, product class and key differentiator may each have a specific grammatical syntax that permits their use in this rhetorical structure, while allowing them to be used together or separately by other grammatical structures that serve similar or even widely different rhetorical/communication purposes in other applications.

Another rhetorical structure, such as the comparison between the old and new as shown in block 504, may also use the product name. The rhetorical structure 504 may utilize a key benefit field and comparable product field that have syntax or grammatical structures different than those of the product class or key differentiator. For example, the key differentiator may have a different format than the key benefit. The different syntax for the comparison old/new is based on the rhetorical function of comparison. The payoff statement may be a benefit. The differing syntax would let a re-user emphasize this benefit over others and add flexibility to the application's discussion of the content.

Other rhetorical structures such as rhetorical structure 506 may utilize sentence syntax structures. Each sentence syntax structure may have a specific purpose. Alternately, such as in how does rhetorical structure 508, a rhetorical structure may be formulated using syntax elements that constitute nouns or phrases as well as syntax structures that include sentences and paragraphs. Syntax structure elements such as the product name may be reused in many rhetorical structures. Other elements may be specific to a given rhetorical structure. Further, these rhetorical structures and the syntax elements may be selectively utilized for different purposes.

An e-brochure may be built utilizing the comparison between the old and new 504 as well as a supplemental comparison between the old and new 506. Alternately, a proposal builder 514 may utilize the classical definition structure 502, the product how does rhetorical structure 508, and the features rhetorical structure 510. In this manner, elements and structures associated with a content subject may be selectively utilized to produce content for differing purposes.

FIG. 6 depicts an exemplary tag-segmented data file 600. The tag-segmented data file may, for example, be an XML file. The XML file may be produced by the content management system from the content stored in the content database. The tag-segmented data file 600 may be used to store a complete data record or partial data associated with a content subject. In the exemplary embodiment of FIG. 6, a product profile is specified. The product profile may have an associated product ID. The data may be further segmented for use in specific markets or regions as indicated by the <Region> tag. <PAC> indicates a specific region and several specific regions may be specified. A tag and tag end are provided for the product name, expanded product name, update date, and update time. These latter two are content management elements. In addition, tags are provided for subdivisions of content elements. For example, a <Description> tag may identify one or more sets of description elements. A description element may for example follow a classical format as indicated by the <Classical_Def> tag. Elements that follow the grammatical format of the classical definition may then be provided as indicated by separate tags. For example, a class description 602, product description 604, and comparison sentence 606 may be provided. The class description and product description may be combined with the product name to form a classical rhetorical sentence. The comparison sentence 606 may be appended to the classical definition to form a paragraph for use in building content.

Additional files such as XSL files may specify how a sentence or content is to be constructed using the content elements of the XML file. The actual output is shown.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of content management comprising:
  receiving a user input entered in a plurality of grammatical structured text entry elements associated with a content subject, each of the plurality of grammatical structured text entry elements having a rhetorical structure to facilitate selective assembly into at least one sentence;
  storing the plurality of grammatical structured text entry elements in a data record associated with the content subject;
  converting at least a portion of the data record into a structured format file supporting rhetorical elements, the structured format file including at least one grammatical structured text entry element of the plurality of grammatical structured text entry elements; and
  rendering an electronically displayable document using the structured format file, the electronically displayable document including the at least one grammatical structured text entry element integrated into at least one sentence.

2. The method of claim 1, wherein the structure format file includes XML coding.

3. The method of claim 1, wherein the structured format file includes data record set coding.

4. The method of claim 1, wherein the electronically displayable document is a web page.

5. The method of claim 1, wherein the electronically displayable document is a proposal.

6. The method of claim 1, wherein the electronically displayable document is an electronic brochure.

7. The method of claim 1, wherein the grammatical structured text entry element is a product description including a verb having a specified verb tense.

8. The method of claim 1, wherein the grammatical structured text entry element is a phrase associated with a specified verb and article.

9. An automated method of generating a proposal, the method comprising:

retrieving a first rhetorical element of a plurality of rhetorical elements available for retrieval from computer storage;

retrieving a second rhetorical element from the plurality of rhetorical elements;

retrieving a third rhetorical element from the plurality of rhetorical elements, the third rhetorical element including a product feature;

constructing a sentence by combining the first rhetorical element the second rhetorical element and the third rhetorical element; and automatically generating an electronically distributable proposal including the sentence.

10. The method of claim 9, wherein at least one of the plurality of rhetorical elements is associated with a product description.

11. The method of claim 9, wherein the first rhetorical element is associated with a classical definition.

12. The method of claim 11, wherein the classical definition includes a product name, a product class, and a product differentiator.

13. The method of claim 12, wherein the second rhetorical element identifies product functionality.

14. A method of content management comprising:

receiving a user input entered in a plurality of grammatical structured text entry elements associated with a content subject, each of the plurality of grammatical structured text entry elements having a rhetorical structure to facilitate selective assembly into at least one sentence;

storing the plurality of grammatical structured text entry elements in a data record associated with the content subject, the text entry elements configured in accordance with a structure based upon an audience profile;

converting at least a portion of the data record into a structured format file supporting rhetorical elements, the structured format file including at least one grammatical structured text entry element of the plurality of grammatical structured text entry elements; and rendering an electronically displayable document using the structured format file, the electronically displayable document including the at least one grammatical structured text entry element integrated into at least one sentence, the displayable document assembled in response to the audience profile.

15. The method of claim 14, wherein the structure format file includes XML coding.

16. The method of claim 14, wherein the structured format file includes data record set coding.

17. The method of claim 14, wherein the electronically displayable document is a web page including content customized based on the audience profile.

18. The method of claim 14, wherein the electronically displayable document is a proposal including content customized based on the audience profile.

19. The method of claim 14, wherein the electronically displayable document is an electronic brochure including content customized based on the audience profile.

20. The method of claim 14, wherein the audience profile includes a language factor and a level of technical content factor.

21. The method of claim 14, wherein the grammatical structured text entry element is a phrase associated with a specified verb and article.

22. The method of claim 14, wherein the electronically displayable document is a PDF file including content customized based on the audience profile.

23. An automated method of generating a proposal, the method comprising:

retrieving a first rhetorical element of a plurality of rhetorical elements available for retrieval from computer storage;

retrieving a second rhetorical element from the plurality of rhetorical elements;

retrieving a third rhetorical element from the plurality of rhetorical elements, the third rhetorical element including a product feature;

constructing a sentence, paragraph, or section by combining the first rhetorical element the second rhetorical element, and the third rhetorical element; wherein the first rhetorical element is displayed using a first degree of technical content and a second degree of technical content, the second degree being greater in technical specificity than the first degree of technical content; and automatically generating the proposal including the sentence, the proposal modified based on an audience profile.

24. The method of claim 23, wherein at least one of the plurality of rhetorical elements is associated with a product description.

25. The method of claim 23, wherein the first rhetorical element is associated with a classical definition.

26. The method of claim 25, wherein the classical definition includes a product name, a product class, and a product differentiator.

27. The method of claim 26, wherein the second rhetorical element identifies product functionality.

* * * * *